BEST AVAILABLE COPY

R. W. Potter,

Mounting Photographs,

No. 3,125. Reissued Sep. 22, 1868.

Witnesses.
S. W. Coombs
G. W. Reed.

Inventor.
R. W. Potter

AM. PHOTO-LITHO. CO. N.Y. (OSBORNE'S PROCESS.)

United States Patent Office.

GARRETT P. BERGEN, OF BROOKLYN, ASSIGNEE OF R. W. POTTER, OF NEW YORK, N. Y.

*Letters Patent No.* 46,699, *dated March* 7, 1865; *reissue No.* 3,125, *dated September* 22, 1868.

PICTURE CARD-FRAME.

The Schedule referred to in these Letters Patent and making part of the same.

TO ALL WHOM IT MAY CONCERN:

Be it known that R. W. POTTER, of the city, county, and State of New York, did invent a new and improved Frame for Pictures; and the following is declared to be a full, clear, and exact description of the same, reference being had to the accompanying drawings, forming part of this specification, in which—

Similar letters of reference in both figures indicate corresponding parts.

Figure 1:
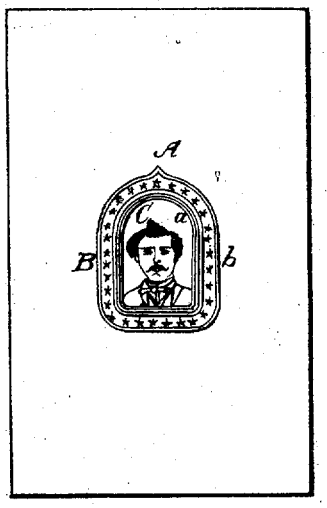
Figure 1 represents a face view of said frame.
Figure 2:
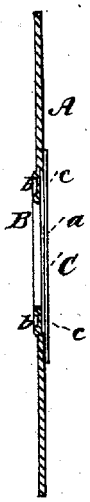
Figure 2 is a transverse vertical section of the same.

This invention consists of a card picture-frame, formed with a raised or embossed figure around an opening, in such a manner that an ambrotype, daguerreotype, or other photographic picture, or a picture of any other description, can be placed at the back of the frame, which serves to exhibit it to good advantage.

In order to produce these frames with as little labor as possible, the centre is cut out to suit the size of the picture, and the border embossed around the hole thus formed simultaneously or by one and the same operation by which the cutting is effected.

To enable others skilled in the art to make and use the invention, it is now described.

A represents a flat sheet or card, cut out of thick paper or other material, of the usual size of photographic-picture cards, or of any other suitable or desirable size. This is provided in the centre with a frame, B, formed by cutting out a hole, *a*, and embossing or raising the border *b* round the hole by means of dies, or in any other suitable manner.

By the operation of embossing the border of the hole *a*, a cavity, *c*, is formed at the back of the frame, capable of receiving the picture, C.

This picture may be made on paper, or on a metal plate, or on a thin piece of glass, or on leather, or on any suitable material, and it may be produced either by painting or by the photographic process, and the hole in the card A must be large enough to show the picture through it. Said picture may be cut to suit the cavity *c* in the back of the card, and is placed therein, and held by pasting a thin piece of paper or other suitable material over it.

By this simple invention, photographic and other pictures of any description can be protected and preserved in this neat and cheap frame. A picture will thus show to better advantage than when pasted on a card in the usual manner; it requires less care to paste it on, and it can readily be removed from the frame and replaced by another, when desired.

What is claimed, and to be secured by Letters Patent, is—

1. A card-frame for a picture, formed with an opening embossed around its edges, substantially as set forth.
2. Cutting a hole and simultaneously embossing the border in a picture-frame, substantially as specified.

Dated, this seventh day of October, 1867.

GARRETT P. BERGEN.

Witnesses:

CHAS. H. SMITH,

GEO. T. PINCKNEY.